UNITED STATES PATENT OFFICE.

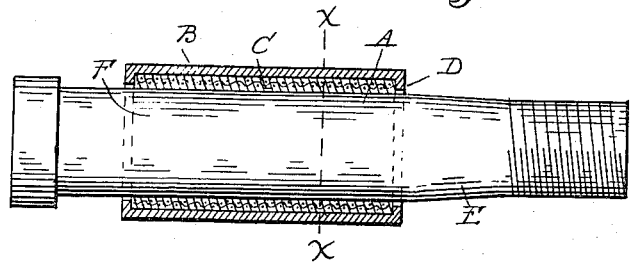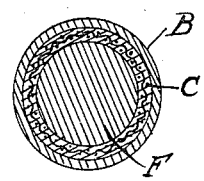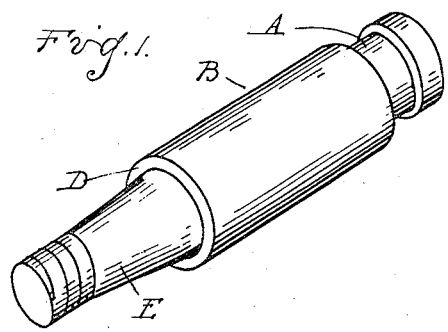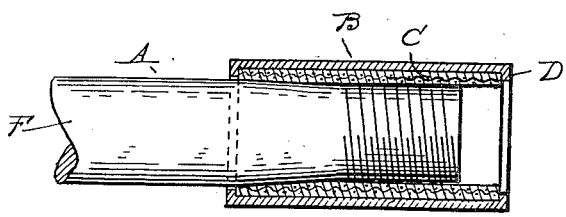

NORBERT L. OBRECHT AND NEWTON SKILLMAN, OF DETROIT, MICHIGAN, ASSIGNORS TO O. AND S. BEARING COMPANY, OF DETROIT, MICHIGAN, A PARTNERSHIP COMPOSED OF HARRY SKILLMAN, NORBERT L. OBRECHT, AND NEWTON SKILLMAN.

BEARING.

1,141,974.     Specification of Letters Patent.     Patented June 8, 1915.

Application filed August 30, 1913. Serial No. 787,542.

*To all whom it may concern:*

Be it known that we, NORBERT L. OBRECHT and NEWTON SKILLMAN, citizens of the United States of America, residing at Detroit, in the county of Wayne and State of Michigan, have invented certain new and useful Improvements in Bearings, of which the following is a specification, reference being had therein to the accompanying drawings.

Our invention relates to bearings, and more particularly to a type of bearing which is provided with a bushing formed of, or provided with lubricating material.

The invention further relates to the novel method of forming the bearing.

The invention resides in the peculiar construction, arrangement and combination of parts as will more fully hereinafter appear, and to the novel manner of making the bearing.

In the drawings: Figure 1 is a perspective view of one form of bearing embodying the invention; Fig. 2 is a longitudinal central section therethrough; Fig. 3 illustrates a certain step in the formation of the bearing; and Fig. 4 is a section on the line x—x of Fig. 2.

The bearing embodying the invention shown in the drawings comprises an inner section A, an outer section B and a bushing C. The outer section comprises a sleeve, preferably formed of metal, and provided at opposite ends with in-turned flanges D forming retainers for the bushing. The latter is made from a compressible, expansible lubricating material, and for this material we find it desirable to employ a strip of asbestos reinforced with wire to better maintain its shape, the asbestos being impregnated with a solid lubricant such as graphite or the like. This particular type of lubricating material is however, not a part of the invention of this application. The inner member A is herein shown as formed of a bolt having a slightly tapered portion E adjacent the threaded end thereof. The outer surface F of this bolt is polished, and is designed to turn within the bushing C.

In making up the bearing a strip of fabric of a length so that the ends will meet when arranged within the sleeve B, is positioned within the sleeve, and after the fabric is so positioned, it is preferably initially compressed by suitable mechanism. The inner diameter of the bushing after being initially compressed is, however, slightly less than the diameter of the portion of the inner member which engages the bushing. When the parts are as shown in Fig. 3 the inner member is forced through the bushing, and during the latter operation the tapering part E of the bolt will serve to further compress the bushing so that when the parts are assembled, the bushing will be compressed intermediate the inner and outer members, and as the bushing is formed of expansible material, it will exert an expansible pressure upon the inner and outer members.

The amount of compression placed upon the bushing varies according to the use for which the bearing is to be employed. For making up bearings for the eyes of vehicle springs the bushing is subjected to a pressure of about 10,000 pounds, though as before stated, this pressure will vary according to the size and other requirements of the bearing. Instead of placing a material initial compression upon the bushing when it is within the outer member, the greater part of the compressing of the lubricating material may be effected during the forcing of the tapering inner member therethrough. As will be noted upon reference to Fig. 2, when the parts are assembled the flanges D have their inner ends spaced a slight distance from the surface F of the section A.

The construction herein described forms a simple and efficient bearing which is self lubricating, and also the method employed for forming this bearing permits the article to be easily and cheaply manufactured.

While we have shown and described the desired form of our invention, we do not wish to limit our protection to the exact structure illustrated or the specific steps recited in the making of the bearing.

What we claim as our invention is—

1. A bearing comprising inner and outer longitudinally engageable sections, and a bushing of compressed expansible material arranged intermediate the inner and outer sections and exerting an expansible pressure thereupon, one of said sections being provided with an inclined portion, whereby the bushing is radially compressed during the assembling of the inner and outer sections.

2. A bearing comprising an outer member, a bushing of compressed expansible material therein, and an inner member inserted longitudinally through the bushing and upon which said bushing exerts an expansible pressure, said inner member having one end tapered, whereby the bushing is radially compressed during the assembling of the inner and outer members.

3. A bearing comprising a sleeve, a bushing of compressed expansible material therein, a shaft longitudinally insertible through the bushing and having one end tapered, whereby the bushing is radially compressed during the assembling of the sleeve and shaft.

4. A bearing comprising a sleeve provided with flanges at its opposite ends, a bushing of compressed expansible material therein, a shaft insertible longitudinally through said bushing and having its forward end tapered, whereby the bushing is radially compressed during the insertion of the shaft through the bushing.

5. The combination with inner and outer longitudinally engageable members arranged for relative movement, of a bushing of compressed expansible material arranged intermediate the inner and outer members and exerting an expansible pressure thereupon, one of said members being provided with an inclined portion, whereby the bushing is radially compressed during the assembling of the inner and outer members.

In testimony whereof we affix our signatures in presence of two witnesses.

NORBERT L. OBRECHT.
NEWTON SKILLMAN.

Witnesses:
WM. J. BELKNAP,
JAMES P. BARRY.